US006931011B2

(12) United States Patent
Giacopelli et al.

(10) Patent No.: US 6,931,011 B2
(45) Date of Patent: Aug. 16, 2005

(54) METHOD AND SYSTEMS FOR BANDWIDTH MANAGEMENT IN PACKET DATA NETWORKS

(75) Inventors: James N. Giacopelli, Hillsborough, NJ (US); David E. Ruddock, Hillsborough, NJ (US); Michelle R. Stevens, Freehold, NJ (US); Robert L. Young, Califon, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 734 days.

(21) Appl. No.: 09/773,073

(22) Filed: Jan. 31, 2001

(65) Prior Publication Data

US 2002/0101826 A1 Aug. 1, 2002

(51) Int. Cl.[7] .............................................. H04L 12/28
(52) U.S. Cl. ................................. 370/395.21; 370/468
(58) Field of Search .................................. 370/252, 401, 370/410, 352, 395.2, 395.21, 395.3, 230, 229, 235, 236, 354, 353, 468, 477, 436, 493; 375/222

(56) References Cited

U.S. PATENT DOCUMENTS

| 5,539,884 | A | * | 7/1996 | Robrock, II | 709/227 |
|---|---|---|---|---|---|
| 5,541,917 | A | * | 7/1996 | Farris | 370/352 |
| 5,995,607 | A | * | 11/1999 | Beyda et al. | 379/202.01 |
| 6,097,722 | A | * | 8/2000 | Graham et al. | 370/395.21 |
| 6,122,255 | A | * | 9/2000 | Bartholomew et al. | 370/237 |
| 6,259,778 | B1 | * | 7/2001 | Corwith | 379/115.01 |
| 6,324,279 | B1 | * | 11/2001 | Kalmanek et al. | 379/229 |
| 6,389,130 | B1 | * | 5/2002 | Shenoda et al. | 379/221.08 |
| 6,628,761 | B1 | * | 9/2003 | Adamczyk et al. | 379/88.19 |
| 6,667,971 | B1 | * | 12/2003 | Modarressi et al. | 370/352 |
| 6,718,026 | B1 | * | 4/2004 | Pershan et al. | 379/211.01 |
| 2002/0055995 | A1 | * | 5/2002 | Beckwith et al. | 709/223 |
| 2004/0028209 | A1 | * | 2/2004 | Fleming et al. | 379/221.13 |

* cited by examiner

Primary Examiner—Bob Phunkulh
Assistant Examiner—Ian N. Moore
(74) Attorney, Agent, or Firm—Joseph Giordano

(57) ABSTRACT

A method and system for bandwidth management in a packet-based network utilizes processing based on bandwidth management policies defined by subscribers and service providers. This method and system allow a subscriber to control the bandwidth available for sessions in near-real time and simplify provisioning at hubs and gateways by allowing the voice/data bandwidth ratio to be established independently of the provisioned bandwidth for voice and data. Bandwidth management policies are stored in the database of the service manager. When a request for modification of the maximum bandwidth parameter for an access hub is received, a mid-call event is detected or a new session is attempted by a subscriber, the service manager determines the current bandwidth utilization and whether this current bandwidth utilization exceeds the maximum bandwidth defined. If the new maximum bandwidth is exceeded, the service manager performs policy processing. Policy processing involves the retrieval of bandwidth management policies from the service manager database and the determination of the method of bandwidth reduction supported by the access hub. If forced reduction of bandwidth is supported, the bandwidth management entity identifies a current session at the access hub for bandwidth reduction and attempts connectivity modification. If successful, the call processing entity determines a new bandwidth utilization based on the reduced bandwidth and whether the new bandwidth exceeds the maximum bandwidth defined by the subscriber. If the maximum bandwidth is still exceeded, the service manager will repeats policy processing to identify another session for bandwidth reduction.

6 Claims, 7 Drawing Sheets

METHOD AND SYSTEMS FOR BANDWIDTH MANAGEMENT IN PACKET DATA NETWORKS

FIELD OF THE INVENTION

This invention relates to bandwidth management in next generation packet data networks.

BACKGROUND

Users of network services are increasingly seeking from a single network provider value-added, multi-faceted communications capabilities, ranging from basic narrow-band voice telephony services to advanced broadband, multimedia services. Users are also seeking higher communications bandwidths and greater control over that bandwidth. Next generation networks (NGNs) offer service providers a platform to satisfy these user needs, while promoting innovation and reducing management costs and time to market.

An NGN is a packet-based network that employs new control, management, and signaling techniques to provide voice, data, video and multimedia services. (In this document, we refer to data, video, and multimedia services as data.) A generalized local service provider NGN architecture is shown in FIG. 1. It consists of two sub networks, a public switched telephone network (PSTN) 102 and a data packet network 104. The packet network is further divided into access packet networks 106 and a backbone network 108. Subscribers 120 are connected to the access network 106 via access hubs 110. Access hubs are also know by other terms such as access gateways, integrated access devices, media gateways, and residential gateways. Access hubs 110 bridge the transport technologies used in subscriber networks 112 with the transport technologies used in access packet networks 106. The particular implementation of an access hub 110 depends on the technology utilized in the access network and the subscriber network. For example, in the case of residential customers, the subscriber network 112 is typically based on digital subscriber loop (xDSL) technology deployed in the local loop or data over cable service interface specification (DOCSIS) technology deployed over coax cable. The access network 106 would then include digital subscriber loop (DSLAM) functionality. Customers, such as business subscribers, may own and operate access hubs as equipment on their premises. Alternatively, the service provider may operate access hubs serving multiple subscribers.

The access network 106 and the backbone network 108 are optimized for efficient transmission of large amounts of data and typically use internet protocol (IP), asynchronous transfer mode (ATM) and/or synchronous optical network (SONET) technologies. The access network 106 is connected to the backbone network 108 by a network gateway 114. The network gateway 114 provides the communications interface between the data packet network 104 and the PSTN 102. The network gateway 114 also aggregates traffic from multiple access hubs 110 and delivers the traffic to the backbone network 108 for transmission.

An NGN 100 has its own control infrastructure. Typically, network elements are designated to support service, session and connection signaling. We shall refer to these elements herein as service managers (SMs) 116 but these elements are also referred to in the industry as media gateway controllers, call agents, gatekeepers, and signaling agents.

Networks, including NGNs, have limited bandwidth. With the advent of new, sophisticated NGN services, the demands for access to this limited network bandwidth have increased dramatically. To meet these demands, NGN providers are continually striving to increase the efficiency of network traffic control through bandwidth management techniques.

In an NGN, access network bandwidth is shared between signaling, voice, and data traffic. In current implementations, data and voice traffic compete for bandwidth, with the voice packets having priority over data packets and signaling packets having priority over voice packets. Therefore, the guaranteed minimum bandwidth available for data traffic equals the overall network bandwidth less the bandwidth allocated to signaling and voice traffic. One consequence of this implementation is that the guaranteed minimum bandwidth available for data may not always be adequate to handle the subscriber's dynamic data traffic needs. When additional bandwidth is required for a data session (e.g., video session or high priority data transfer), the bandwidth allocated to the voice sessions needs to be reduced to ensure that the voice traffic does not starve the data session. Once the data session completes, the bandwidth available for the voice session can be restored.

Prior techniques addressing re-allocation of bandwidth in ATM networks using private virtual circuits (PVCs) required a customer to contact a service provider and request a bandwidth modification. The service provider would then tear down the connection and re-establish it at the new bandwidth. This approach to re-allocation of bandwidth results in the clearing of any active sessions on the PVC. In addition, the process of contacting the service provider and having the service provider modify the connection could result in lengthy delays.

Alternate approaches focus on improving the utilization of link bandwidth. Typically, these approaches involve the implementation of traffic control algorithms in the network. These algorithms are generally implemented in the network elements and apply to all traffic within the network. Therefore, a subscriber does not have the ability to tailor bandwidth management for its line numbers and access hubs.

An objective of our invention is to provide a system and method to allow a user to proactively manage the bandwidth associated with his line numbers and associated access hubs. It is yet another objective of our invention to simplify bandwidth provisioning at access hubs and network gateways by allowing voice/data bandwidth ratio to be established independently of the provisioned bandwidth for voice and data and for changes to the ratio to be made in near real-time.

SUMMARY

Our invention allows for the near-real-time control of bandwidth provision by a subscriber. In our invention, the subscriber can control the bandwidth available for voice sessions when more or less bandwidth is needed for data. For example, corporations can use their ATM network during the day for voice and data traffic. At night, when voice calls are at their lowest, the corporate subscriber can reduce the maximum bandwidth for voice to ensure adequate bandwidth for high capacity backups of mission critical systems. Our invention also simplifies provisioning at hubs and gateways by allowing voice/data bandwidth ratio to be established independently of the provisioned bandwidth for voice and data when the provisioned voice bandwidth is set to the maximum possible value.

In the first mode of operation of our invention, bandwidth management policies defined by a subscriber are stored in the database of the service manager. These policies are communicated from the subscriber to the policy server entity in the service manager via a configuration and provisioning entity or an advanced intelligent network (AIN) service control point (SCP). In response to a request for modification of the maximum bandwidth parameter for an access hub contained in one of the communicated policies, the call processing entity of the service manager determines the current bandwidth utilization for the hub and whether this current bandwidth utilization exceeds the new maximum bandwidth defined by the subscriber. If the new maximum bandwidth is exceeded, the service manager performs policy processing in the bandwidth management processing entity.

In the policy processing step, the bandwidth management processing entity retrieves bandwidth management policies defined for the access hub from the service manager database. From these policies, the bandwidth management processing entity determines whether the access hub supports graceful or forced bandwidth reduction for existing sessions. If graceful reduction of bandwidth is supported, the service manager returns to normal call processing. If forced reduction of bandwidth is supported, the bandwidth management entity identifies a current session at the access hub for bandwidth reduction. The bandwidth management entity analyzes information retrieved from the session and service provider bandwidth management policies to make this determination. When a session is identified, the connectivity associated with that session must be modified to support the new reduced bandwidth. When the service manager receives an indication that the connectivity modification was successful, the call processing entity determines a new bandwidth utilization based on the reduced bandwidth and whether the new bandwidth exceeds the maximum bandwidth defined by the subscriber. If the maximum bandwidth is still exceeded, the service manager will repeats policy processing to identify another session for bandwidth reduction.

In the second mode of operation of our invention, bandwidth management is invoked when a new session is attempted for a subscriber. In response to this new call attempt for a subscriber with policy-based bandwidth management, the service manager retrieves the bandwidth management policies defined by the subscriber and the service provider that are stored in the service manager database. The call processing entity of the service manager then determines the bandwidth utilization required to support the call attempt at the hub and whether the additional required bandwidth utilization exceeds the maximum bandwidth defined by the subscriber. If the new maximum bandwidth is exceeded, the service manager performs policy processing in the bandwidth management processing entity, as discussed in the first mode, above.

In the third mode of operation of our invention, the access hub communicates to the service manager when the access hub detects a mid-call event for a subscriber.

In response to this communication, the service manager determines whether the subscriber supports policy-based bandwidth management. If policy-based bandwidth management is supported, the service manager retrieves the bandwidth management policies defined by the subscriber and the service provider that are stored in the service manager database. The call processing entity of the service manager then determines the bandwidth utilization required to support the mid-call event at the hub and whether the additional required bandwidth utilization exceeds the maximum bandwidth defined by the subscriber. If the new maximum bandwidth is exceeded, the service manager performs policy processing in the bandwidth management processing entity, as discussed in the first mode above.

DETAILED DESCRIPTION OF PREFERRED EMBODIMENTS

Figure 1:
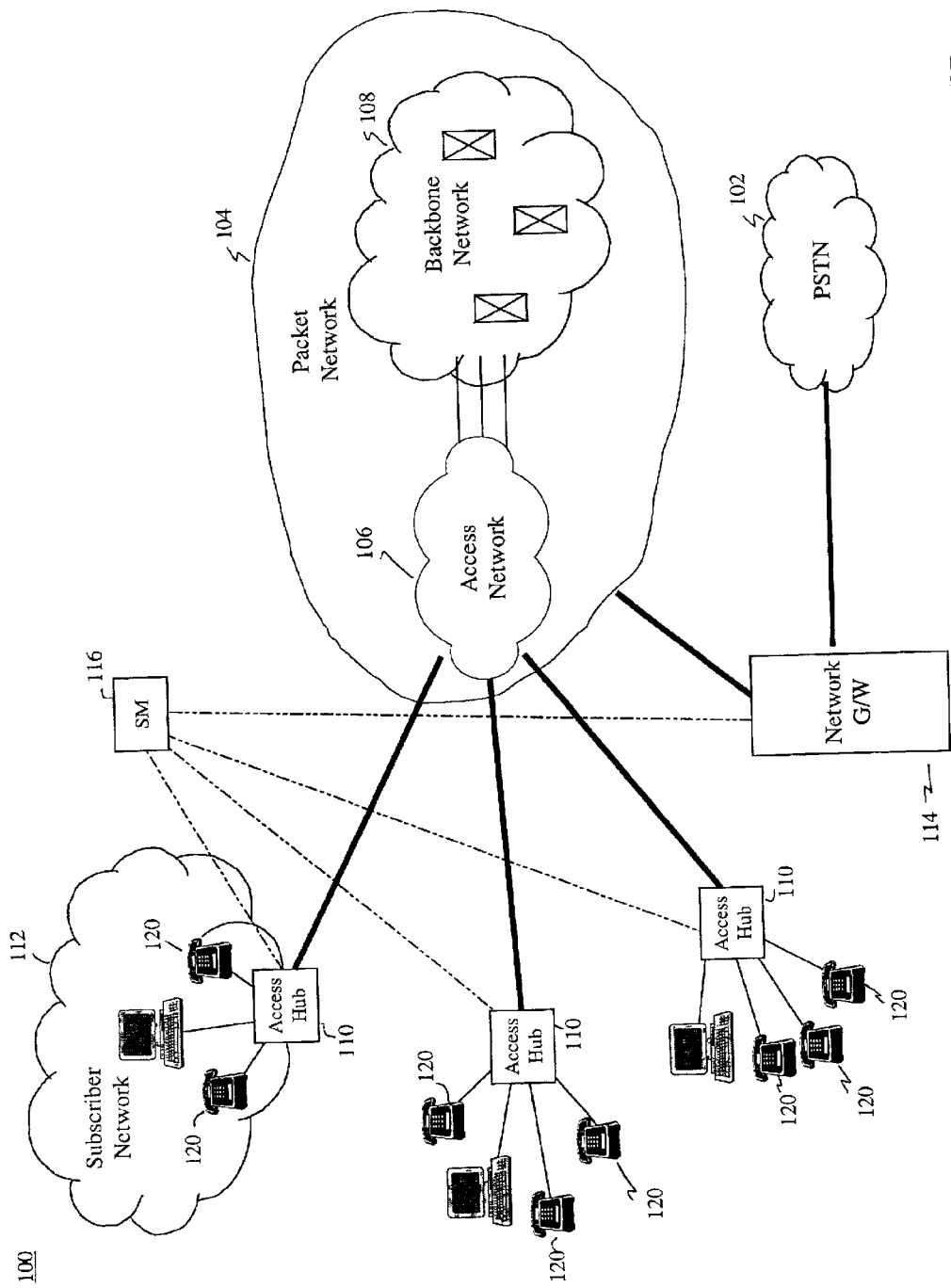
FIG. 1 is a network diagram illustrating a typical next generation network.
Figure 2:
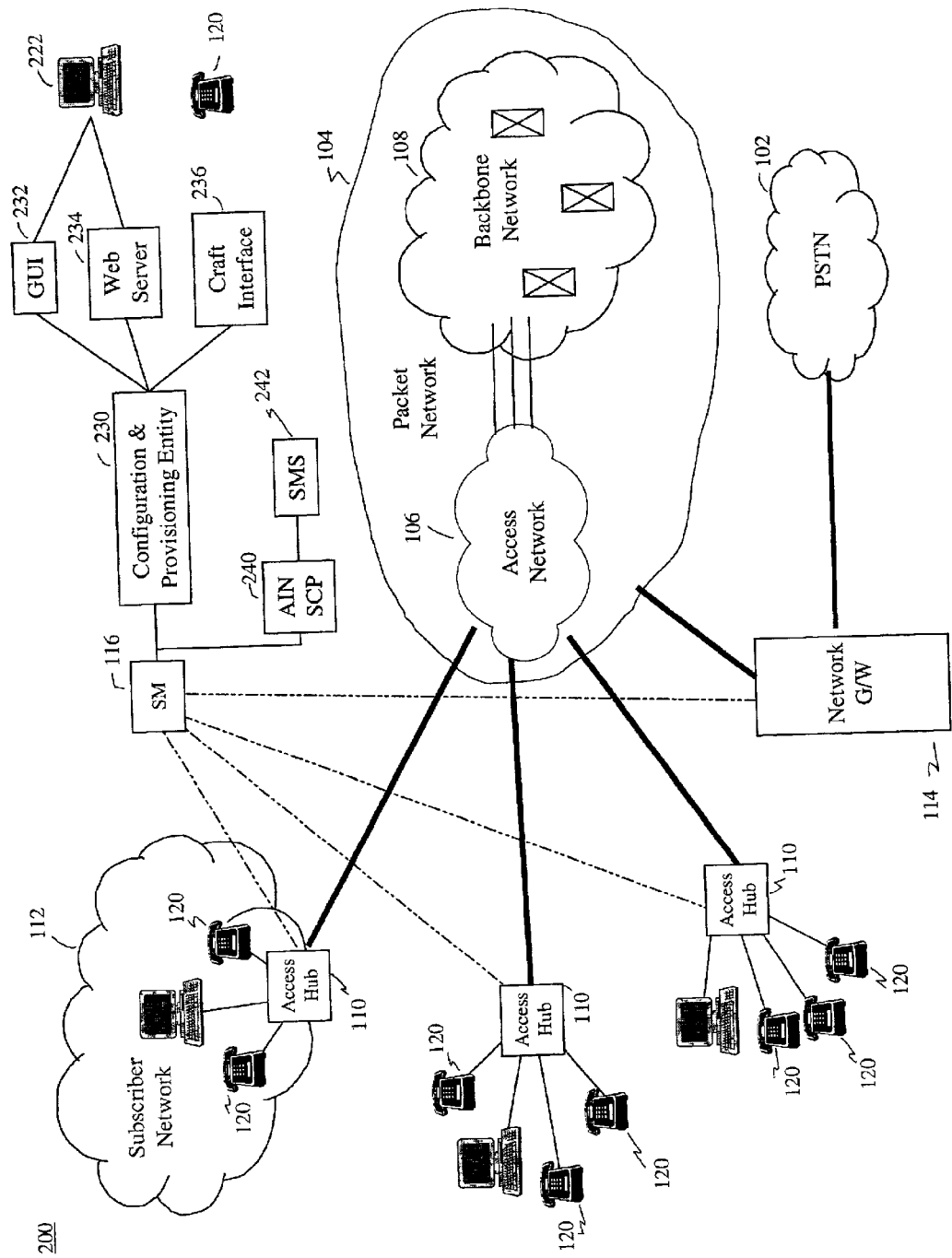
FIG. 2 is a network diagram of an illustrative embodiment of a network generation network in accordance with our invention.

FIG. 2 depicts a next generation network (NGN) 200 according to a specific illustrative embodiment of the invention. The illustrative NGN of FIG. 2 includes a SM with policy-based bandwidth management capabilities 216, a configuration and provisioning entity 230 with a graphical user interface (GUI) 232, a web server interface 234, and a craft interface 236, an advanced intelligent network (AIN) service control point (SCP) 240, and a service management system (SMS) 242. In addition, the NGN 200 includes subscribers 120, access hubs 110, an access network 106, a network gateway 114, a backbone packet network 108, and a PSTN 102, as described in relation to FIG. 1.

The configuration and provisioning entity 230 may be located on a remote platform or its functions may be incorporated into the SM 216. If located on a remote platform, the configuration and provisioning entity 230 communicates with the SM 216 via a data communication link. The configuration and provision entity 230 includes interface capabilities to allow a subscriber to communicate bandwidth management policies to the SM 216 via a data communications terminal 222. The data communications terminal 222 may be located at a subscriber's premises or at a remote site.

The configuration and provisioning interfaces are advantageously a GUI 232 and a web server interface 234. The configuration and provision entity 230 also includes a craft interface 236 to allow NGN service provider access to the configuration and provision entity functions. The craft interface 236 further provides the capability for the NGN service provider to communicate bandwidth management policies defined by the subscriber and by the service provider to the SM 216. A subscriber without access to the GUI 232 or web server interface 234 may opt to have its management policies communicated in this way.

An NGN service provider may also use an AIN SCP to communicate subscriber and service provider bandwidth management policies to an SM 216. The policies can be created by the service provider or alternatively, by a subscriber, via the service creation environment of the SMS 242. The AIN SCP 240 communicates with the SM 216 and the SMS 242 communicates with the AIN SCP 240 via a data communications link.

Figure 3:
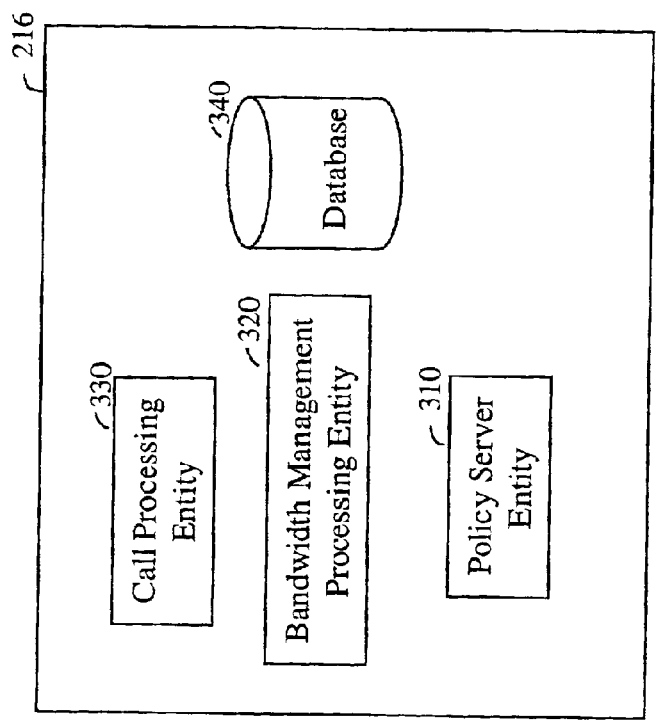
FIG. 3 depicts an illustrative service manager for the network of FIG. 2.

FIG. 3 is a block diagram of an SM 216 with policy-based bandwidth management capabilities, in accordance with the invention. The SM 216 includes a policy server entity 310, a call processing entity 330, a bandwidth management processing entity 320, and a database 340. The database 340 stores the bandwidth management policies defined by the subscriber and by the service provider. The subscriber-defined policies provide bandwidth management rules and parameters for line numbers and access hubs assigned to a subscriber. These rules and parameters are advantageously grouped into session policies, addressing rules and parameters associated with sessions originating from or terminating to a subscriber's line numbers, and access hub policies, addressing rules and parameters associated with access hubs assigned to the subscriber. An example of a parameter or rule in an access hub policy is the maximum bandwidth associated with the hub. The NGN service provider policies provide rules and parameters to be applied to all subscribers or a defined subset of subscribers. An example of a service provider defined policy is the classification of all Emergency calls as priority originations. In alternate embodiments, subscriber and service providers can define additional groupings, parameters and rule sets for bandwidth management.

The policy server entity 310 accepts and processes updates to bandwidth management policies received from the AIN SCP 240 or the configuration and provisioning entity 230. The bandwidth management processing entity 320 contains capabilities to process session, hub, and service provider bandwidth management policies. The call processing entity 330 provides the core NGN session processing capabilities.

Figure 4:
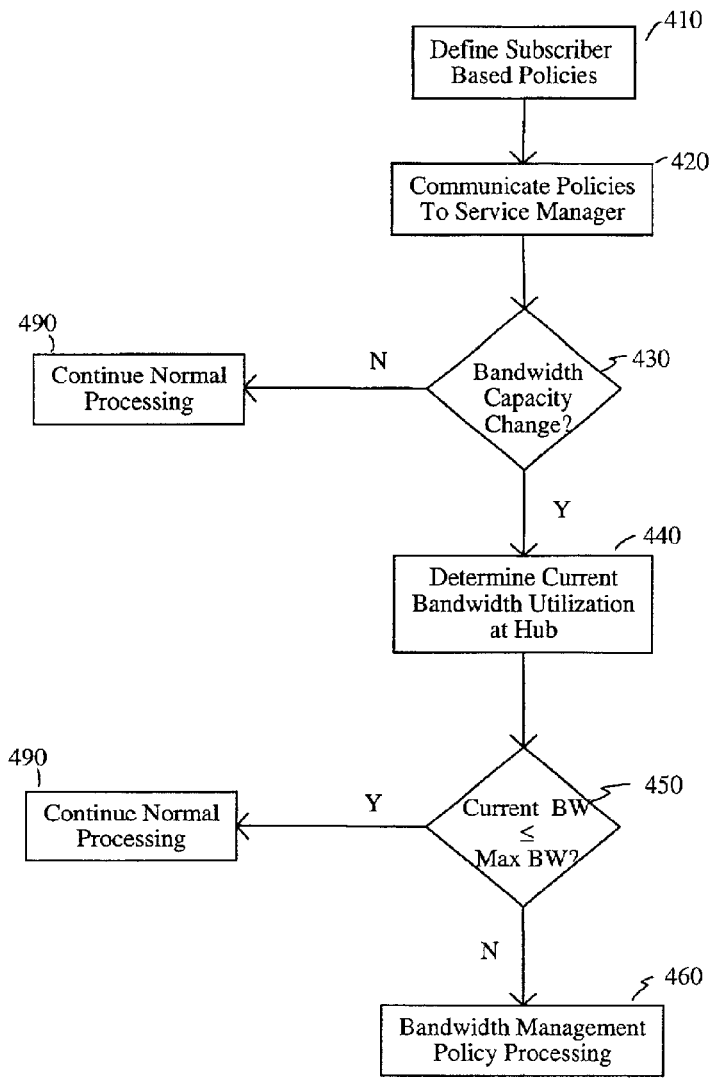
FIG. 4 is a flow diagram illustrating a method of providing policy based bandwidth management when a bandwidth management capacity change occurs.

An illustrative method of a first mode of operation in accordance with our invention is set forth in FIG. 4. The method begins at step 410 when an NGN subscriber 120 defines bandwidth management rules and parameters for their assigned line numbers and access hubs. As described above, these rules and parameters are logically grouped into session and access hub policies. In an alternate embodiment, the NGN service provider can set default session and access hub policies for subscribers 120 or offer a set of pre-defined policies from which the subscriber can choose.

At step 420, the subscriber 120 communicates the defined policies to the SM 216. The policy server entity 310 of the SM 216 accepts and processes these updates. Typically, a subscriber 120 will communicate the defined policies from a data communications terminal 222 to the configuration and provisioning entity 230 via the GUI 232 or web service interface 234 of the configuration and provisioning entity 230. The configuration and provisioning entity 230 then communicates the files to the policy server entity 310 of the service manager via a data communications link. Alternatively, the subscriber 120 could contact the service provider via another method such as the telephone and request the service provider to enter policies on the subscriber's behalf. The service provider then communicates the subscriber's policies to the policy server entity 310 from the SMS 242 via the AIN SCP 240 or from the craft interface 236.

If no maximum bandwidth parameter is to be changed (step 430), normal processing is continued (step 490). However, when the maximum bandwidth parameter for a hub is to be modified (step 430), the SM 216 invokes call processing procedures in the call processing entity to determine the current bandwidth utilization at the hub (step 440) and whether the current bandwidth utilization exceeds the maximum bandwidth defined by the subscriber (step 450). If the current bandwidth utilization has not exceeded the maximum bandwidth, the SM 216 returns to normal processing (step 490). If the current bandwidth utilization exceeds the new maximum bandwidth, the SM 216 invokes policy processing in the bandwidth management processing entity 320 (step 460).

Figure 5:
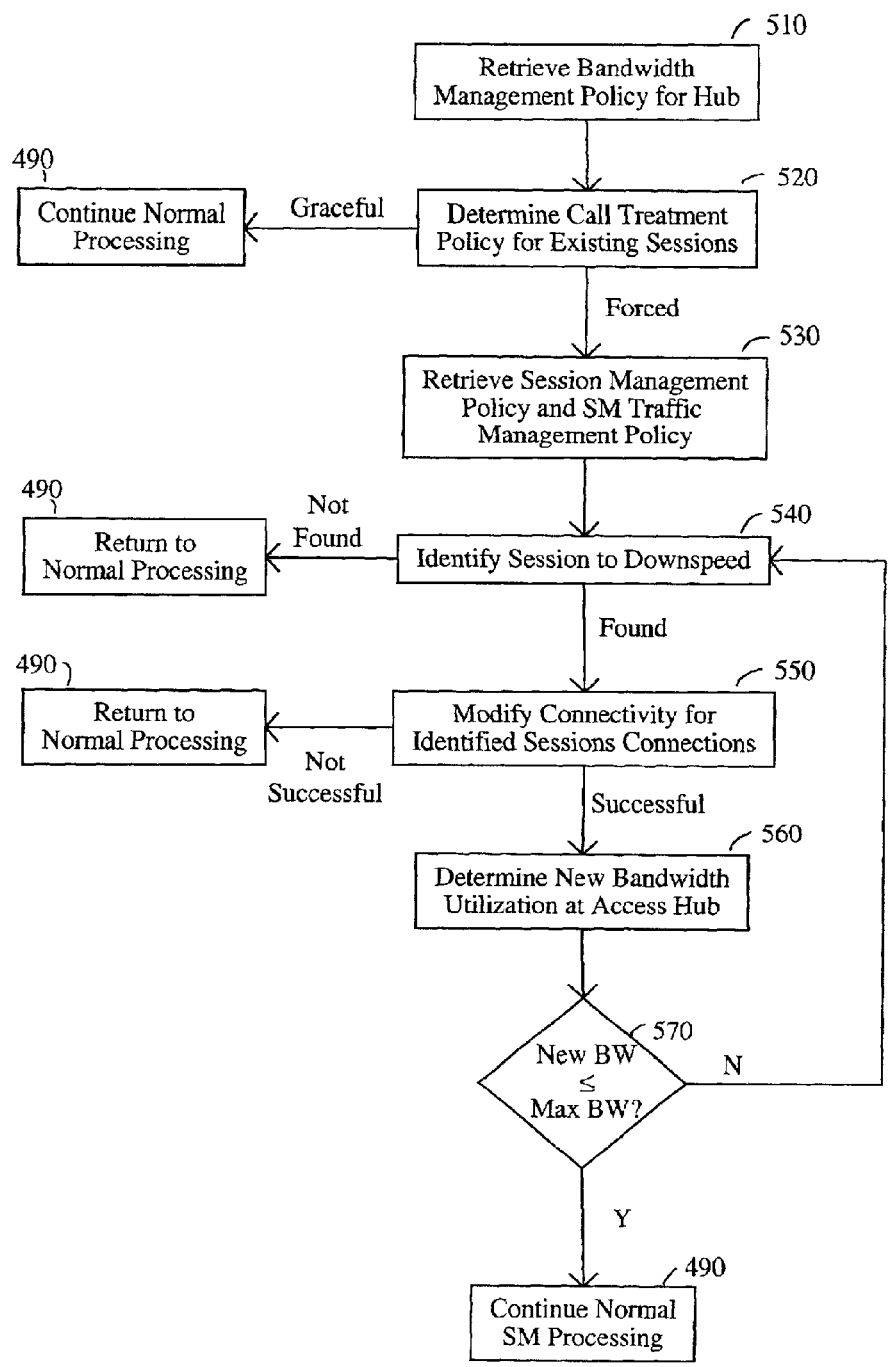
FIG. 5 is a flow diagram illustrating a method of providing bandwidth management policy processing when the maximum bandwidth is exceeded.

Policy processing is illustrated in FIG. 5. When policy processing is invoked, the bandwidth management processing entity 320 retrieves the bandwidth management policies defined for the access hub 110 from the database 340 (step 510). At step 520, the bandwidth management processing entity 320 determines the call treatment rules for existing sessions at the access hub 110. If the call treatment rule indicates graceful reduction of bandwidth, the SM 216 does not impact existing sessions at the hub 110 and returns to normal processing (step 490). For graceful call treatment, bandwidth reduction is accomplished through limiting the bandwidth of sessions originating from and terminating to the access hub 110 in the future.

If the call treatment rule indicates forced reduction of bandwidth, the bandwidth management processing entity 320 retrieves the session and service provider bandwidth management policies from the database 340 (step 530). Based on the information contained in these policies, the bandwidth management processing entity identifies a session for bandwidth reduction (step 540). The session identification process uses parameters such as the bandwidth reduction eligibility parameter of the session management policy and the charge class parameters defined in the service provider policy to identify the optimal session for bandwidth reduction. For example, in a bandwidth reduction eligibility parameter, a subscriber may designate that certain sessions originating from a line are not eligible for bandwidth reduction. Similarly, the service provider may designate that sessions with a charge class of Emergency or sessions involving conference resources are not eligible for bandwidth reduction. If the SM cannot identify a session for bandwidth reduction, the SM terminates policy processing and returns to normal processing (step 490). In this situation, bandwidth reduction is accomplished as discussed above for graceful call treatment.

When a session for bandwidth reduction has been successfully identified, the bandwidth management processing entity 320 modifies the connectivity for the identified session (step 550). In this step, the SM 216 communicates the request for bandwidth reduction to each access hub 110 and network gateway 114 associated with the session. If the SM 216 is advised that the request for bandwidth reduction was not successful, the SM 216 returns to normal processing (step 490). However, if the SM 216 receives an acknowledgment indicating that the request was successful and the bandwidth has been reduced, the SM 216 invokes call processing in the call processing entity 330 to determine the new bandwidth utilization for the access hub 110 (step 560). If the call processing entity 330 determines at step 570 that the new bandwidth utilization does not exceed the new maximum defined for the access hub 110, the SM 216 returns to normal processing (step 490). If the call processing entity 330 determines that the new bandwidth utilization exceeds the new maximum bandwidth, the SM 216 repeats steps 540 through 570 until the new maximum bandwidth is not exceeded.

Figure 6:
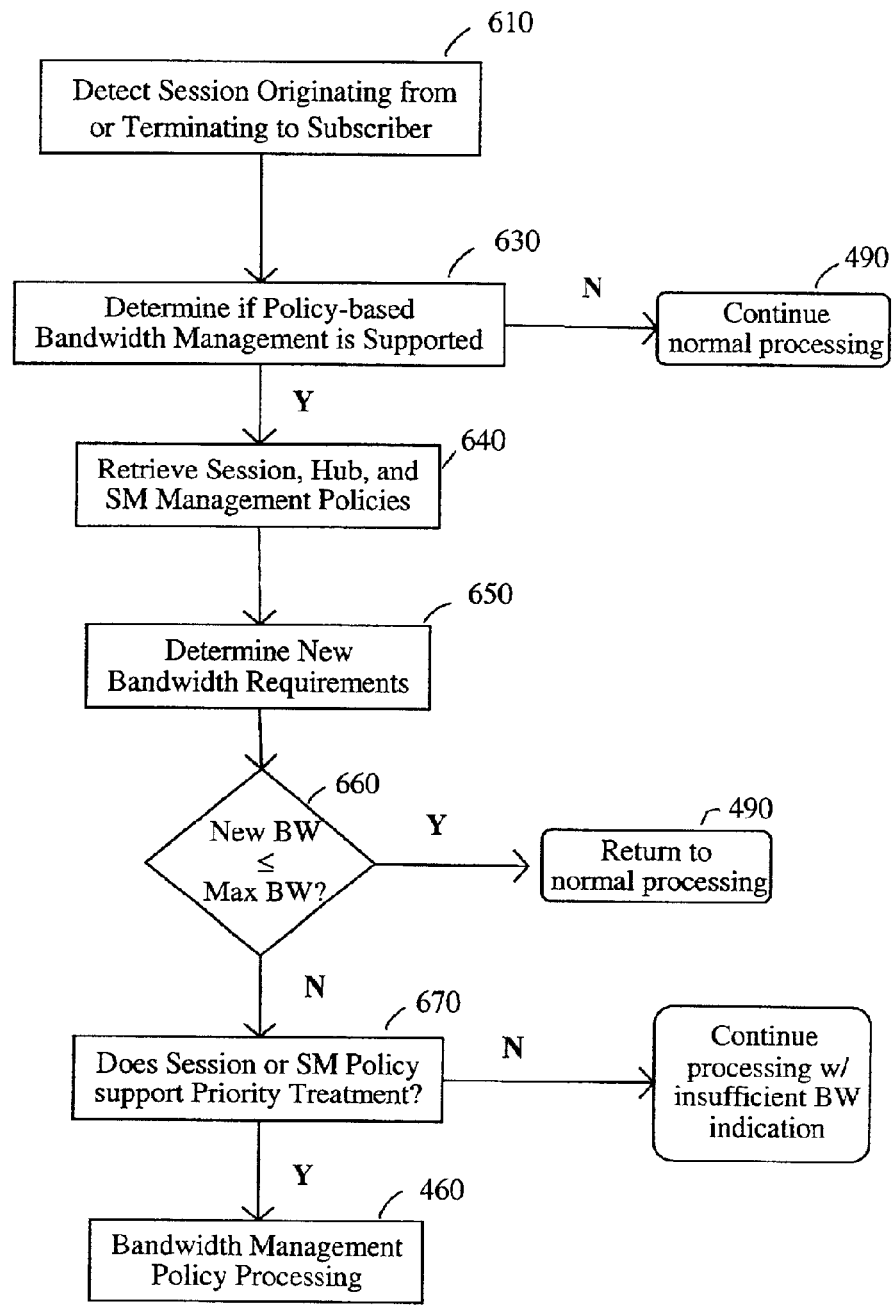
FIG. 6 is a flow diagram illustrating a method of providing policy based bandwidth management when a session attempt is detected by an access hub.

An illustrative method of a second mode of operation in accordance with our invention is set forth in FIG. 6. The method begins at step 610 when, as part of normal processing, SM 216 detects a call attempt associated with a subscriber's line number. The call attempt could be a call origination from the subscriber 120 or a call termination to the subscriber 120. At step 630, the SM 216 determines whether policy-based bandwidth management is supported for the subscriber. If policy-based bandwidth management is not supported, the SM 216 continues normal call processing (step 490). If policy-based bandwidth management is supported, the SM 216 retrieves the bandwidth management policies associated with the subscriber and the service provider from the database 340 (step 640).

The SM 216 then invokes call processing in the call processing entity to determine the bandwidth required at the hub to support the new session (step 650). If the bandwidth required is equal to or less than the maximum bandwidth defined in the hub policy, the SM 216 returns to normal processing (step 490). If the bandwidth required exceeds the maximum bandwidth, the call processing entity 330 determines whether the session should receive prior treatment (e.g., sessions with a charge class of Emergency) (step 670). If priority treatment is not supported for this session, the call processing entity 330 continues normal processing with an insufficient bandwidth indication. If priority treatment is supported for the new session, the SM invokes policy processing in the bandwidth management processing entity (step 460). The policy processing performed is identical to the processing described in association with FIG. 5 (steps 510–570).

Figure 7:
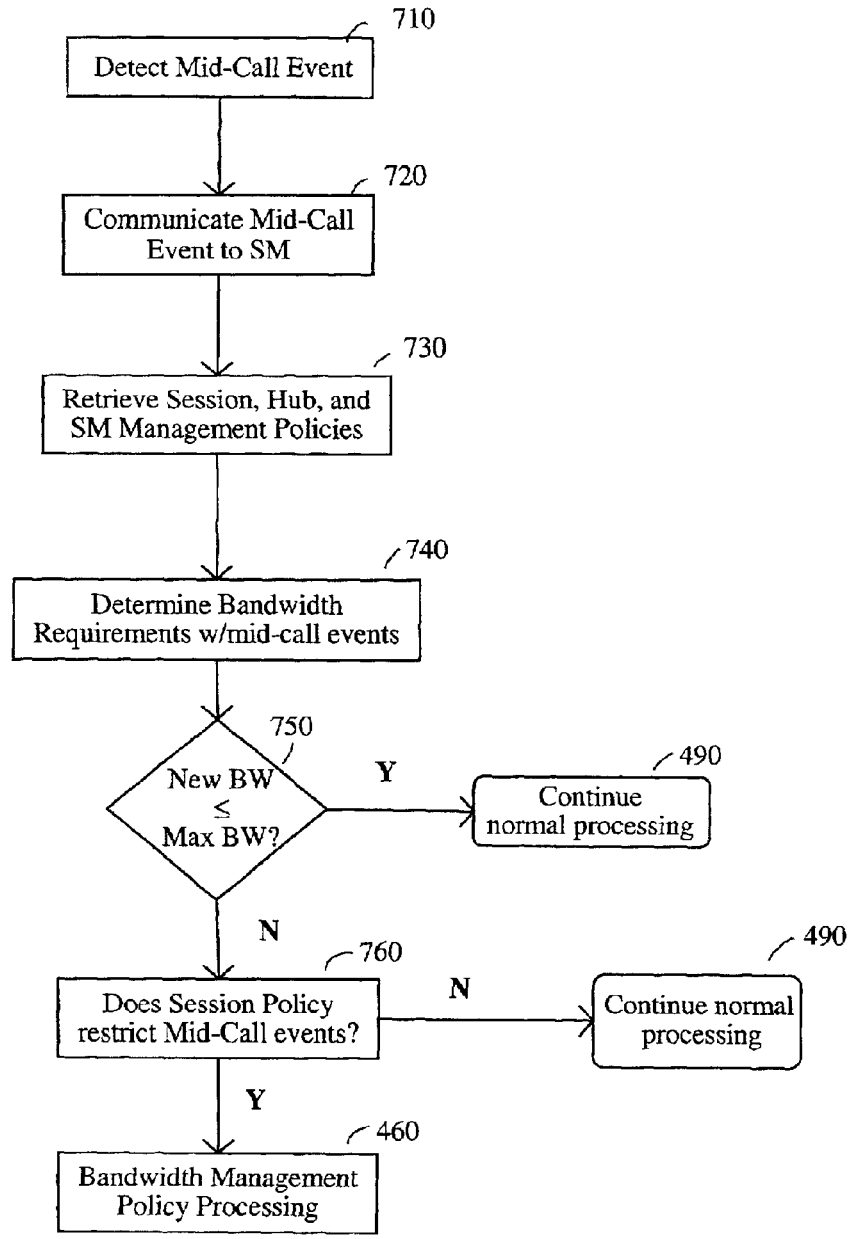
FIG. 7 is a flow diagram illustrating a method of providing policy based bandwidth management when an access hub detects a mid-call event.

An illustrative method of a third mode of operation in accordance with our invention is set forth in FIG. 7. The method begins at step 710, when an access hub 110 detects a mid-call event. Examples of mid-call events include requests for conference resources and fax tones or modem tones detected events. The detection of a mid-call event is communicated by the access hub 110 to the SM 216 (step 720). When a mid-call event notification is received, the SM 216 retrieves the bandwidth management policies associated with the subscriber 120 and the service provider from the database 340 (step 730).

The SM 216 then invokes call processing in the call processing entity to determine the bandwidth required at the hub to support the mid-call event (step 740). If the bandwidth required does not exceeded the maximum bandwidth defined in the hub policy, the SM 216 returns to normal processing (step 490). If the bandwidth required exceeds the maximum bandwidth, the SM determines whether the associated subscriber or service provider bandwidth management policies restrict mid-call events (step 760). If mid-call events are restricted, the SM 216 continues normal processing without modifying the bandwidth for the session. If mid-call events are not restricted, the SM invokes policy processing in the bandwidth management processing entity (step 460). The policy processing performed is identical to the processing described in association with FIG. 5 (steps 510–570).

Although the invention has been shown and described with respect to exemplary embodiments thereof, it should be understood by those skilled in the art that various changes, omissions and additions may be therein and thereto, without departing from the spirit and the scope of the invention.

We claim:

1. A method for managing bandwidth in a packet data network in response to subscriber defined polices, said network including a service manager of a network service provider, a plurality of access hubs, and an access network, said service manager including a policy server entity, a call processing entity, a bandwidth management processing entity and a data store, said method comprising the steps of:

storing in the data store bandwidth management policies as defined by a subscriber for the plurality of access hubs and the line numbers assigned to that subscriber;

communicating said policies to the policy server entity in the service manager of the network service provider;

in response to a request for modification of the maximum bandwidth parameter in the communicated policy for one access hub of the subscriber, determining in the call processing entity in the service manager a current bandwidth utilization at the one access hub and whether the current bandwidth utilization exceeds a maximum bandwidth defined by the subscriber and stored in the data store; and if such determination indicates that the requested bandwidth utilization exceeds the maximum bandwidth defined by the subscriber and stored in the data store, retrieving the bandwidth management policies defined for the one access hub from the data store of the service manager;

determining a call treatment rule for existing sessions at the one access hub;

if the call treatment rule indicates graceful reduction of bandwidth or existing sessions, invoking normal call processing in the call processing entity; and if the call treatment rule indicates forced reduction of bandwidth for existing sessions, performing the steps of:

retrieving the session and the service provider bandwidth management policies from the data store of the service manager;

analyzing, in the bandwidth management processing entity in the service manager information contained in the access hub, session, and service provider bandwidth management policies to identify an existing session at the one access hub for bandwidth reduction;

in response to a successful identification of a session for bandwidth reduction, modifying the connectivity for the identified session;

in response to an indication of successful connectivity modification, determining in the call processing entity in the service manager a new bandwidth utilization for the one access hub and whether the new bandwidth utilization exceeds the maximum bandwidth defined by the subscriber and stored in the data store; and if such determination indicates that the new bandwidth utilization exceeds the maximum bandwidth defined by the subscriber and stored in the data store, repeating policy processing in the bandwidth management processing entity to identify another session for bandwidth reduction.

2. The method in claim 1 wherein the step of analyzing the information contained in the access hub, session, and service provider bandwidth management policies includes analyzing a bandwidth reduction eligibility parameter defined by the subscriber and stored in the session policy and the charge class parameters defined by the service provider and stored the service provider policy.

3. The method of claim 1 wherein the step of modifying the connectivity for the identified session further includes the steps of:

communicating a request for bandwidth management to each access hub and network gateway associated with the identified session; and communicating from each access hub and network gateway to the service manager an indication of whether the bandwidth reduction was successful.

4. A method for managing bandwidth in a packet data network in response to subscriber defined policies, said network including a service manager of a network service provider, a plurality of access hubs, and an access network, said service manager including a policy server entity, call processing entity, a bandwidth management processing entity and a data store, said method comprising the steps of:

storing in the data store bandwidth management policies as defined by a subscriber for the plurality of access hubs and the line numbers assigned to that subscriber;

identifying a call attempt at one access hub;

determining, in the service manager, whether policy-based bandwidth management is supported for the subscriber;

if policy-based bandwidth management is supported by the subscriber, retrieving bandwidth management policies associated with the subscriber and the service provider from the data store in the service manager;

determining, in the call processing entity, a bandwidth utilization required to support the new session at the one access hub and whether the required bandwidth utilization exceeds a maximum bandwidth defined by the subscriber and stored in the data store of the service manager; and if such determination indicates that the required bandwidth exceeds the maximum bandwidth defined by the subscriber and stored in the data store, retrieving the bandwidth management policies defined for the one access hub from the data store of the service manager;

determining a call treatment rule for existing sessions at the one access hub;

if the call treatment rule indicates graceful reduction of bandwidth for existing sessions, invoking normal call processing in the call processing entity; and if the call treatment rule indicates forced reduction of bandwidth for existing sessions, performing the steps of:

retrieving the session and the service provider bandwidth management policies from the data store of the service manager;

analyzing, in the bandwidth management processing entity in the service manager information contained in the access hub, session, and service provider bandwidth management policies to identify an existing session at the one access hub for bandwidth reduction;

in response to a successful identification of a session for bandwidth reduction, modifying the connectivity for the identified session;

in response to an indication of successful connectivity modification, determining in the call processing entity in the service manager a new bandwidth utilization for the one access hub and whether the new bandwidth utilization exceeds the maximum bandwidth defined by the subscriber and stored in the data store; and if such determination indicates that the new bandwidth utilization exceeds the maximum bandwidth defined by the subscriber and stored in the data store, repeating policy processing in the bandwidth management processing entity to identify another session for bandwidth reduction.

5. The method of claim 4 wherein the step of analyzing the information contained in the access hub, session, and service provider bandwidth management policies includes analyzing a bandwidth reduction eligibility parameter defined by the subscriber and stored in the session policy and the charge class parameters defined by the service provider and stored in the service provider policy.

6. The method of claim 4 wherein the step of modifying the connectivity for the identified session further includes the steps of:

communicating a request for bandwidth management to each access hub and network gateway associated with the identified session; and communicating from each access hub and network gateway to the service manager an indication of whether the bandwidth reduction was successful.

* * * * *

UNITED STATES PATENT AND TRADEMARK OFFICE
CERTIFICATE OF CORRECTION

PATENT NO. : 6,931,011 B2  
DATED : August 16, 2005  
INVENTOR(S) : James N. Giacopelli et al.

It is certified that error appears in the above-identified patent and that said Letters Patent is hereby corrected as shown below:

Column 9,  
Line 5, after "policy server entity," insert -- a --.

Signed and Sealed this

Eleventh Day of October, 2005

JON W. DUDAS  
*Director of the United States Patent and Trademark Office*